United States Patent
Agerstam et al.

(10) Patent No.: US 11,770,459 B2
(45) Date of Patent: *Sep. 26, 2023

(54) FRAMEWORK FOR IOT PROTOCOL IDENTIFICATION AND MANAGEMENT

(71) Applicant: INTEL CORPORATION, Santa Clara, CA (US)

(72) Inventors: Mats Agerstam, Portland, OR (US); David J. McCall, Dallas, TX (US); Vijay Sarathi Kesavan, Portland, OR (US); Maria E. Ramirez Loaiza, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,838

(22) Filed: Jul. 20, 2021

(65) Prior Publication Data

US 2022/0109743 A1   Apr. 7, 2022

Related U.S. Application Data

(63) Continuation of application No. 16/469,382, filed as application No. PCT/US2016/068730 on Dec. 27, 2016, now Pat. No. 11,076,024.

(51) Int. Cl.
*H04L 69/08* (2022.01)
*H04L 67/12* (2022.01)
(Continued)

(52) U.S. Cl.
CPC ............ *H04L 69/08* (2013.01); *H04L 12/283* (2013.01); *H04L 12/2803* (2013.01);
(Continued)

(58) Field of Classification Search
None
See application file for complete search history.

(56) References Cited

U.S. PATENT DOCUMENTS 9,007,631 B2 * 4/2015 Hagiwara ............... H04L 41/22
358/1.9
9,094,407 B1 * 7/2015 Matthieu ................. H04L 63/10
(Continued)

FOREIGN PATENT DOCUMENTS

EP    1544723    6/2005

OTHER PUBLICATIONS

Chinese Patent Office, "Notice of allowance," issued in connection with CN patent application No. 201680091172.1, dated May 18, 2022, 7 pages.

(Continued)

*Primary Examiner* — Lashonda Jacobs-Burton
(74) *Attorney, Agent, or Firm* — HANLEY, FLIGHT & ZIMMERMAN, LLC

(57) ABSTRACT

Methods, apparatus, systems and articles of manufacture are disclosed to identify and manage IoT protocols and associated devices. An example apparatus includes a gateway device to communicate according to a first protocol. The example gateway device includes a plugin agent to discover a first device and probe the first device to gather data regarding a protocol of the first device. The example plugin agent is to transmit the gathered data to a plugin manager to determine whether the first device is to communicate via the first protocol, and, when the first device is unable to communicate via the first protocol, determine a plugin for the gateway device to enable the gateway device to communicate with the first device, the plugin agent to provision the plugin for the gateway device with respect to the first device.

20 Claims, 12 Drawing Sheets

(51) Int. Cl.
  *H04W 8/00* (2009.01)
  *H04L 67/00* (2022.01)
  *H04L 12/28* (2006.01)
  *H04W 88/16* (2009.01)

(52) U.S. Cl.
  CPC .............. *H04L 67/12* (2013.01); *H04L 67/34* (2013.01); *H04W 8/005* (2013.01); *H04W 88/16* (2013.01)

(56) References Cited

U.S. PATENT DOCUMENTS

| | | | |
|---|---|---|---|
| 9,210,534 B1* | 12/2015 | Matthieu | H04L 51/066 |
| 9,396,005 B2* | 7/2016 | Huang | G06F 8/71 |
| 9,557,982 B2* | 1/2017 | Xi | G06F 8/61 |
| 9,942,837 B2* | 4/2018 | Zakaria | H04W 4/80 |
| 10,212,178 B2* | 2/2019 | Cheng | H04L 67/303 |
| 10,299,091 B2* | 5/2019 | Schoppmeier | H04W 4/70 |
| 10,419,385 B2* | 9/2019 | Ruggeri | H04L 51/56 |
| 10,432,704 B2* | 10/2019 | Jolfaei | H04L 67/565 |
| 10,506,691 B2* | 12/2019 | Klecha | H04W 4/33 |
| 10,681,544 B2* | 6/2020 | Luo | H04W 12/009 |
| 10,771,491 B2* | 9/2020 | Cheng | H04L 63/1425 |
| 11,076,024 B2 | 7/2021 | Agerstam et al. | |
| 11,483,418 B2* | 10/2022 | Agerstam | H04L 67/51 |
| 2002/0112084 A1* | 8/2002 | Deen | G06F 13/387 |
| | | | 709/250 |
| 2002/0178126 A1 | 11/2002 | Beck et al. | |
| 2013/0188864 A1* | 7/2013 | Moraleda | G06F 18/217 |
| | | | 382/164 |
| 2014/0052783 A1* | 2/2014 | Swatsky | H04W 80/04 |
| | | | 709/204 |
| 2015/0006748 A1* | 1/2015 | Kashou | H04L 69/08 |
| | | | 709/230 |
| 2015/0052509 A1* | 2/2015 | Wang | G06F 9/44526 |
| | | | 717/174 |
| 2015/0156266 A1* | 6/2015 | Gupta | H04L 67/12 |
| | | | 709/224 |
| 2015/0295763 A1* | 10/2015 | Yu | H04L 63/02 |
| | | | 726/4 |
| 2017/0134536 A1* | 5/2017 | Tessiore | H04L 69/18 |
| 2017/0187831 A1* | 6/2017 | Otting | H04W 12/041 |
| 2017/0187835 A1* | 6/2017 | Lim | H04L 43/0805 |
| 2017/0244635 A1* | 8/2017 | Felemban | H04L 47/786 |
| 2017/0279894 A1* | 9/2017 | Chen | H04L 67/51 |
| 2018/0034913 A1* | 2/2018 | Matthieu | H04L 67/52 |
| 2018/0034914 A1* | 2/2018 | Christopher | H04L 69/18 |
| 2018/0139090 A1* | 5/2018 | Geiger | H04L 41/0806 |
| 2018/0270079 A1* | 9/2018 | Chamarajnager | H04L 41/046 |
| 2019/0019402 A1* | 1/2019 | Nachshon | H04L 12/2832 |
| 2019/0349426 A1* | 11/2019 | Smith | H04L 61/4505 |
| 2020/0021670 A1 | 1/2020 | Agerstam et al. | |

OTHER PUBLICATIONS

United States Patent and Trademark Office, "Non-Final Office action," issued in connection with U.S. Appl. No. 16/469,382, dated Dec. 15, 2020, 10 pages.

United States Patent and Trademark Office, "Non-Final Office action," issued in connection with U.S. Appl. No. 16/469,382, dated Jul. 10, 2020, 14 pages.

United States Patent and Trademark Office, "Notice of Allowance," issued in connection with U.S. Appl. No. 16/469,382, dated Apr. 5, 2021, 11 pages.

International Searching Authority, "International Search Report and Written Opinion," issued in connection with PCT patent application No. PCT/US2016/068730, dated Aug. 31, 2017, 17 pages.

Jongwoo Sung et al, "Integration of IEEE1451 Sensor Networks and UPnP", Consumer Communications and Networking Conference (CCNC), 2010 7th IEEE, IEEE, Piscataway, NJ, USA, (Jan. 9, 2010), ISBN 978-1-4244-5175-3, Jan. 9, 2010, 2 pages.

Chinese Patent and Trademark Office, "Second office action," issued in connection with CN patent application No. 201680091172. 1, dated Feb. 17, 2022, 22 pages.

* cited by examiner

FRAMEWORK FOR IOT PROTOCOL IDENTIFICATION AND MANAGEMENT

CROSS-REFERENCE TO RELATED APPLICATIONS

This patent arises from U.S. Non-Provisional patent application Ser. No. 16/469,382, which was filed on Jun. 13, 2019 (now U.S. Pat. No. 11,076,024), which claims priority as a National Stage of PCT application No. PCT/US2016/068730, which was filed on Dec. 27, 2016. U.S. Non-Provisional patent application Ser. No. 16/469,382 and PCT patent application No. PCT/US2016/068730 are hereby incorporated herein by reference in their entireties. Priority to U.S. Non-Provisional patent application Ser. No. 16/469,382 and PCT application No. PCT/US2016/068730 is hereby claimed.

FIELD OF THE DISCLOSURE

This disclosure relates generally to internet of things (IoT) devices, and, more particularly, to methods and apparatus to provide a framework for IoT protocol identification and management.

BACKGROUND

In recent years, a number of electronic devices able to generate data has rapidly increased. Some devices capture information regarding their operating environment or operating parameters and/or facilitate communication between connected devices. Network connected devices have facilitated services for household members, building managers and/or businesses, in which the connected devices share information. However, connection and communication between devices can involve significant manual configuration and customization.

Computing and communication ability can be added to a variety of small and large devices. The variety introduces a plurality of disparate communication protocols and complicates communication with and control of devices. Having many possible device form factors, platforms, manufacturers, use cases, etc., introduces many significant difficulties for providers, suppliers, and users seeking to make, sell, and use these devices.

DETAILED DESCRIPTION

Figure 1:
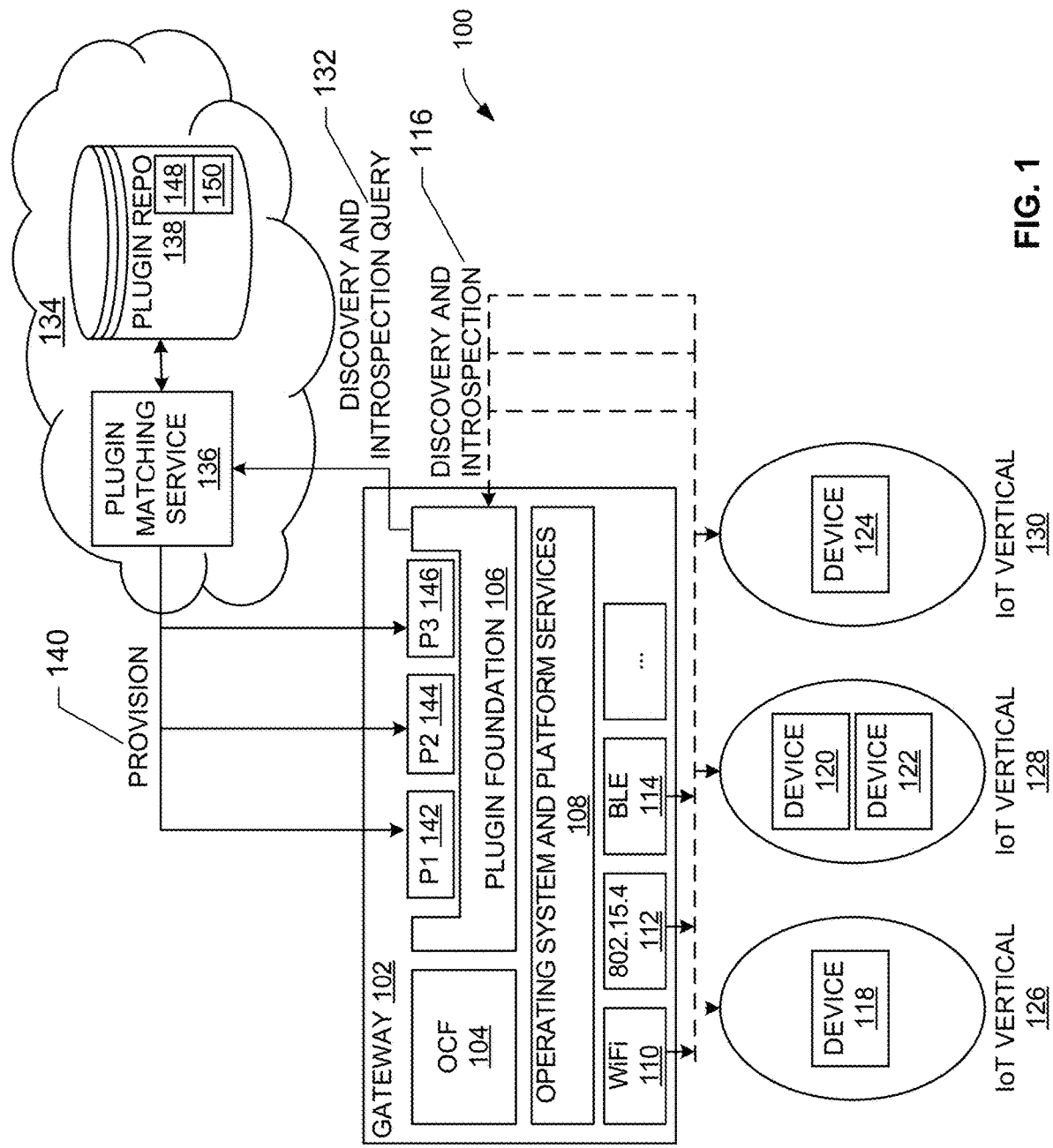
FIG. 1 illustrates a block diagram depicting an example protocol framework to identify IoT devices and/or associated services to facilitate communication and interoperability with a gateway/hub device.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Adoption of IoT devices and services has been explosive in the last couple of years. Initially, IoT suffered from a lack of industry standards, and, later, too many IoT standards and consortiums have fragmented IoT solutions by separately targeting multiple user segments. For example, in the "connected home" or "smart home" segment, many manufacturers are creating siloed solutions with no or very limited interoperability across vendors (e.g., AllSeen, HomeKit, Thread, Open Connectivity Foundation, Nest, Wink, Iris, ZigBee Alliance, Z-Wave Alliance, etc.). As a result, IoT devices in the smart home market today do not deliver on the promise of a smart, connected home for the end user. Instead, application programming interfaces (APIs) for various platforms must be opened, and third party translation layers must be custom-written to bridge the communication gap between platforms.

To enable a smart, connected home, IoT devices should be able to interoperate and communicate with each other to create experiences and solve problems that individual devices cannot solve on their own. APIs may be manually leveraged to facilitate interaction with IoT devices, but such interaction is tedious and manual. Instead, certain examples automatically identify IoT devices across vendors and facilitate bridging and/or other communication translation between devices.

Certain examples provide a plug-and-play (PnP) system including a central smart hub and/or communication device. The "smart hub" device acts as a proxy and/or translation agent and exposes a proprietary and/or otherwise non-standard eco-system of one or more IoT devices to a local domain by translating and projecting IoT device functionality as, for example, Open Connectivity Foundation (OCF) devices and services (and/or other common framework representation of devices and associated services).

Certain examples facilitate identification and interoperability among disparate IoT devices by triggering periodic discovery of IoT devices and associated services in a particular domain (e.g., a home, office, store, and/or other venue, etc.). Previously unidentified (e.g., "new") IoT devices and services are discovered using one or more device discovery strategies (e.g., described further below), and protocol matching (e.g., with assistance of a cloud service, etc.). Once device(s) and/or associated service(s) have been discovered, one or more translation libraries/plugins are identified, downloaded, installed, and authorized for execution to connect the discovered service(s) and/or device(s) in communication with a smart-home hub/gateway device. Thus, certain examples provide an interoperability or bridging solution between different IoT verticals so that IoT device eco-systems can function between verticals via translation between devices facilitated by one or more "hub" or gateway devices at a location (e.g., home, office, store, etc.).

To facilitate interoperability, IoT devices/services and associated eco-systems are adapted to a common framework or standard. As used herein, for purposes of example illustration only, the OCF (Open Connectivity Foundation) is used as an illustrative example for the standard or common format to which non-OCF IoT device communications are converted via plugin translation functions. Using fingerprinting and/or other device discovery techniques, non-OCF IoT devices are identified and translation library(-ies) (e.g., plugins, also referred to as plug-ins, add-in, add-on, extension, etc.) are pushed to and installed on the gateway/hub device and/or the non-OCF IoT devices to enable the gateway/hub device to interact with the non-OCF IoT devices/services as OCF-compliant devices/services, for example.

A plugin is a software component that adds a specific feature to an existing software program, hardware device, firmware, etc. A plugin can be used to customize base software, hardware, firmware, etc. Plugins can be used to add features, support file types/formats, etc. As used herein, the plugin provides a translation library/mapping from one domain to a common domain (e.g., D1→Dc, etc.) to provide a consistent data model representation. A plugin foundation provides a framework to load plugins to allow a gateway/hub device to communicate with a plurality of devices/device types. The gateway device can communicate over a plurality of media to capture device information and provide the information for look-up. For example, the gateway pings devices for information and provides responses to a cloud-based plugin manager to provide an appropriate plugin in response to the request. The plugin can then be used by the gateway device to communicate with the device via the translation between common format and particular device format.

FIG. 1 illustrates a block diagram depicting an example protocol framework 100 to identify IoT devices/services to enable installation of plugins and/or translation libraries to facilitate communication and interoperability with a gateway/hub device. As illustrated in the example of FIG. 1, the protocol framework foundation 100 uses active and passive mechanisms to discover, probe and introspect the IoT eco-systems available in a domain. In certain examples, a cloud-based service may actively assist in helping the gateway device to form relevant messages to query over a network. The query messages or probes can be based on hardware identifiers, network messages (e.g., layer 2 (L2) data link layer and/or layer 3 (L3) network layer messages of the Open Systems Interconnect (OSI) reference model, etc.), or even higher levels protocol exchanges such as multicast Domain Name System (mDNS), Simple Service Delivery Protocol (SSDP), Constrained Application Protocol (CoAP), Hypertext Transfer Protocol (Secure) (HTTP(S)), Universal Plug and Play (UPnP), Zigbee Home Automation (HA), Generic Attribute Profile (GATT), etc. Query messages/probes can be a combination and/or aggregation of data from multiple layers, for example. Response data is analyzed and classified using a cloud service to identify a plugin for each found IoT service. Plugins can then be securely transferred from the cloud repository to the gateway or hub device for installation and enablement, for example.

Thus, translation can be facilitated with interoperability across several layers of a networking stack (Medium Access Control/Physical Layer (MAC/PHY), L3, etc.) to higher level transport protocols, data models, serialization and operations. A hub or gateway device 102 can be equipped with compatible hardware for the IoT device or eco-system it intends to bridge, for example.

Rather than a fixed number of pre-installed translation/plugin libraries and manual side loading of libraries by end user, service provider or original equipment manufacturer (OEM), certain examples provide cross-ecosystem (and/or cross-vendor) interoperability through automated discovery and identification of IoT ecosystems and/or devices to trigger onboarding of a plugin for each identified ecosystem/device. In certain examples, a PnP-based infrastructure for IoT plugins includes common (e.g., open) and/or vendor (e.g., closed) plugin repositories to allow existing and future IoT devices to be introduced to an execution domain. Through the execution domain, the PnP infrastructure can automatically discover IoT devices through a hierarchy of discover actions. Plugins can be automatically acquired and enabled through cloud and/or other repository library acquisition, for example. Plugins can be automatically updated, maintained, quarantined, and/or disabled, for example.

The example plugin infrastructure 100 can provide a runtime framework for translation libraries and/or plugins to be consumed into and registered according to a common framework such as OCF services. Plugins can be enabled on the gateway or hub 102. IoT devices registered as OCF devices form a common foundation across levels of interoperability and security including access control and authorization.

Manual pre-installation and loading of a predetermined fixed number of translations imposes challenges with respect to disc and/or other storage space, memory consumption on the device and the latter has a UX/usability downside. In contrast, certain examples leverage a cloud-assisted service infrastructure to discover various IoT device, eco-system and services to provide a plug-and-play experience on a domain (e.g., home, server message block (SMB), etc.). For discovered and supported devices, the cloud infrastructure provides an over the air (OTA) push of a plugin library to the gateway or hub device to be installed and consumed by the plugin framework. The plugin is authenticated and associated authorization flows executed to allow for the hub/gateway to access the newly added device(s)/service(s). Installed plugins will then provide the translation or bridging functionality between the third party verification (TPV) eco-system and OCF, for example.

As shown in the example of FIG. 1, the gateway 102 includes a protocol framework 104, such as OCF, and a plugin foundation 106, which work with an operating system and platform services 108 to provide a common foundation to support a plurality of devices and plugins. The OCF 104 and plugin foundation 106 help the operating system and platform services 108 to communicate via one or more communication interfaces or connectivity transports such as WiFi™ 110, 802.15.4 low-rate wireless personal network (LR-WPAN) 112, Bluetooth™ Low Energy (BLE) 114, etc.

The plugin foundation 106 facilitates a discovery and introspection process 116 when a device 118, 120, 122, 124 from an IoT vertical 126, 128, 130 seeks communication with the gateway device 102. The device(s) 118, 120, 122, 124 can initiate communication and/or otherwise be detected by the plugin foundation 106 via the communication interface(s) 110-114. The plugin foundation 106 triggers a discovery and introspection query 132 of cloud-based plugin infrastructure 134.

The plugin infrastructure 134 provides a plugin matching service 136 that retrieves plugins from a plugin repository 138 based on identification of the device(s) 118, 120, 122, 124 by the plugin foundation 106. The device(s) 118, 120, 122, 124 is/are identified and matched by the plugin matching service 136, based on the query 132, to a plugin to support communication between the device(s) 118, 120, 122, 124 and the gateway 102. The plugin matching service 136 retrieves the plugin from the plugin repository 138 to support the device(s) 118, 120, 122, 124. The plugin matching services provisions 140 retrieved plugin(s) 142, 144, 146 to the gateway 102. The plugin(s) 142, 144, 146 are installed on the gateway 102 and/or device(s) 118, 120, 122, 124 and used by the plugin foundation 106 to communicate with the device(s) 118, 120, 122, 124. The plugin(s) 142, 144, 146 can be used with the OCF 104 to translate or bridge communication with the device(s) 118-124, for example.

Figure 2:
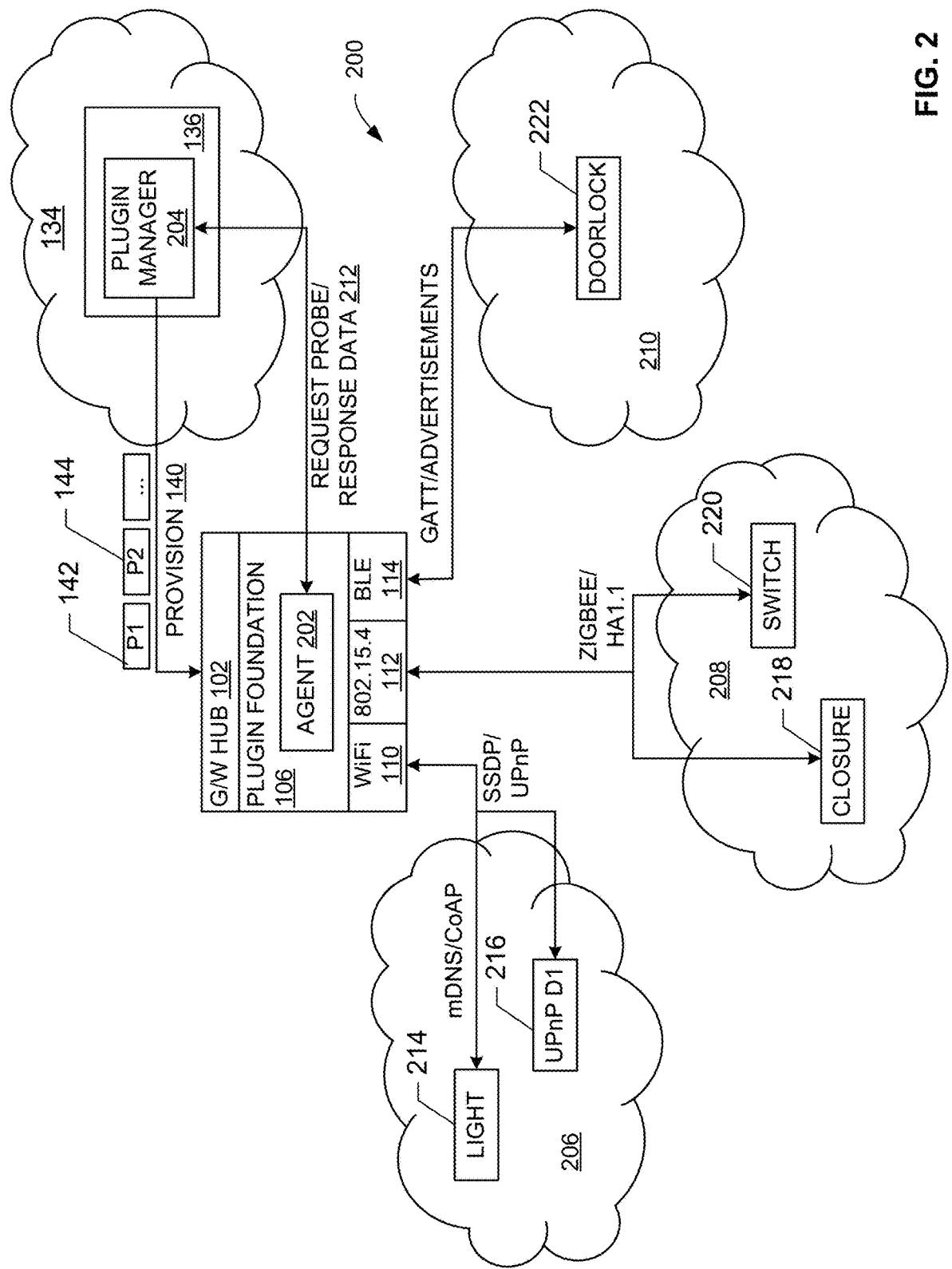
FIG. 2 illustrates a canonical representation of the gateway device of FIG. 1 including a set of connectivity transports to communicate with a plurality of devices and/or services.

FIG. 2 illustrates a canonical representation of the gateway device 102 with a set of connectivity transports 110, 112, 114 (e.g., WiFi™ 802.15.4, Bluetooth Smart™, etc.). A software stack on the gateway 102 may not include resources to host all of the software infrastructure for on-demand discovery, fingerprint matching and introspection to discover a variety of IoT devices and services that are available on the (home) domain. The example implementation of a protocol framework foundation 200 shown in FIG. 2 includes the plugin foundation 106 with a local plugin agent 202 that includes primitive local functions to generate and issue probe/discovery/introspection packets and receive responses (e.g., passively and/or actively) with respect to a cloud plugin manager 204 in the cloud-based plugin infrastructure 134.

As shown in the example of FIG. 2, the plugin foundation 106 issues packet payloads to perform discovery of services/devices 206, 208, 210 available over the supported transports 110, 112, 114. Response data is relayed 212 to the cloud 134 to be matched against known and supported devices. If a match is successful, the plugin manager 204 of the cloud service 134 makes the relevant plugin(s) 142, 144 available for fetching/provisioning 140 to the gateway/hub device 102.

For example, services/devices 206-210 can include a service 206 including a light 214 and a UPnP device 216, a service 208 including a closure 218 and a switch 220, a service 210 including a doorlock 222, etc. In the example of FIG. 2, the light 214 communicates using mDNS/CoAP and the UPnP device 216 communicates using SSOP/UPnP via the WiFi interface 110. In the example of FIG. 2, the closure device 218 and the switch 220 communicate using Zigbee/HA 1.1 via the 802.15.4 interface 112. In the example of FIG. 2, the doorlock 222 communicates GATT/advertisements via the BLE interface 114.

Thus, the gateway 102 queries a connecting service 206-210 and/or its device(s) 214-222 to discover information about the service(s) 206-210 and/or device(s) 214-222. The plugin agent 202 transmits a request probe to the plugin manager 204 with information gathered regarding the connecting service 206-210 and/or its device(s) 214-222. The plugin manager 204 processes the probe to determine a plugin that matches the device/service type, communication format, behavior, etc., based on information provided in the request.

While plug-and-play (PnP) frameworks for locally attached devices enable device lookups based on known identifiers (e.g., a PnP identifier for Microsoft Windows™-based hardware peripherals, etc.), discovery and introspection of IoT services and/or devices is more complicated. Additionally, a vendor of the device 214-222 may not be the party providing a plugin/library for the OCF-based infrastructure 104. Instead, plugs can be developed and supported by OEMs, service providers, enthusiasts, etc. For a protocol/format plugin to be correctly identified by the plugin manager 204 with respect to a deployed IoT service 206-210 and/or its devices 214-222, the plugin can be accompanied by a manifest that describes how its supports device(s) 214-222 and/or service(s) 206-210 can be discovered. For example, as shown in FIG. 2, one or more plugins 248 in the repository 138 can be stored and associated with a manifest 150.

Figure 3:
FIG. 3 shows an example manifest used to discover and identify service(s) and/or associated device(s).

An example table shown in FIG. 3 outlines a few examples of the manifest 150 used to discover and identify service(s) 206-210 and/or associated device(s) 214-222. As shown in the example of FIG. 3, a plurality of devices and services, such as BLE™ service, ZigBee™ device, Internet Protocol version 4/Internet Protocol version 6 (IPv4/IPv6) communication, etc., are defined with respect to a plurality of information, attribute, format, etc. For example, the BLE service has a MAC vendor organizationally unique identifier (OUI), while the ZigBee service does not. In active and/or passive discovery, the BLE service is unassociated and has a service universal unique identifier (UUID) of 16/32/128. The IPv4/IPv6 communication is discoverable based on mDNS, SSDP, or WSMAN. For BLE services, a service introspection format is based on connection and GATT. For the ZigBee device, the service introspection format is based on a device and/or application profile. For IPv4/IPv6, the service introspection format is based on a protocol and port, CoAP, HTTP, etc. Using the example manifest 150 of FIG. 3, the plugin agent 202 and the plugin manager 204 can determine an applicable plugin for each service 206-210 and/or device 214-222.

Based on the plugins that are installed onto the devices 214-222, for example, the cloud plugin manager 204 can include one or more smart learning algorithms employing heuristic techniques to learn the type of devices 214-222 present in certain environments and/or contexts. For example, certain types of devices 214-222 are more likely to be present than other devices 214-222 in certain geographic areas (e.g., certain countries, certain regions of a country, certain building types, etc.). Alternatively or in addition, if a certain device 214-222 is discovered, there is a high probability of finding another device 214-222 from a same manufacturer and/or similar category of functionality, for example. These and/or other heuristics can help the plugin agent 202 and plugin manager 204 to discover and on-board the IoT-enabled device 214-222 to make the device 214-222 available for use, thereby presenting a better user experience and improved operability and interoperability of devices 214-222 (and associated services 206-210), for example.

Figure 4:
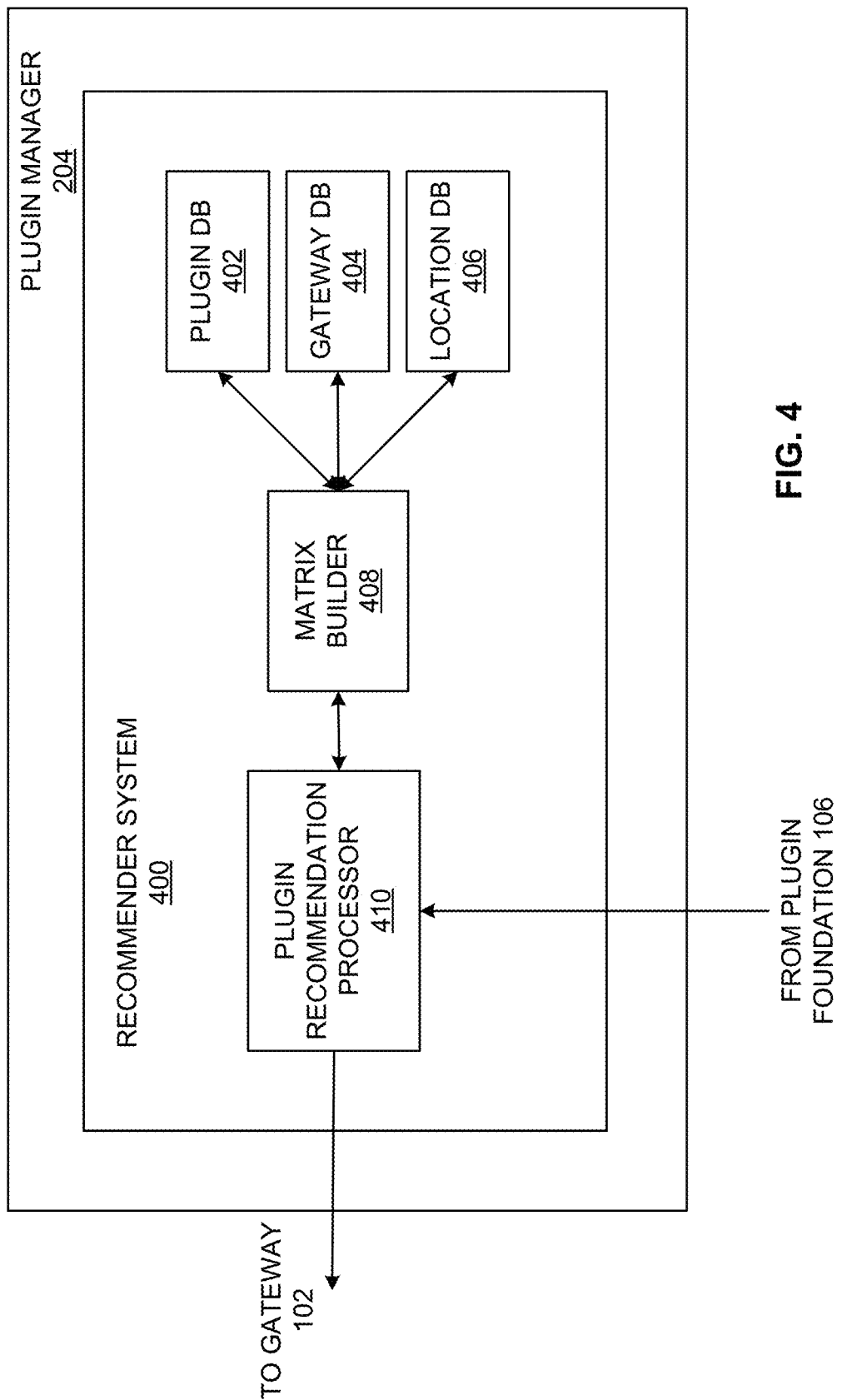
FIG. 4 illustrates an example recommender system to recommend a plugin for a target device and/or service.

In certain examples, application of heuristics and/or other smart learning algorithms to provide plugin identification and recommendation can be facilitated using a recommender system or recommendation service. The recommender system can be implemented using the example plugin manager 204, for example. FIG. 4 illustrates an example recommender system 400 including a plugin database 402, a gateway database 404, and a location database 406. The example plugin database 402 describes requirements, dependencies, and characteristics of each plugin. The example gateway database 404 identifies installed gateway(s) 102, gateway 102 setup and available resources, and installed plugins on each gateway 102. The example location database 406 identifies a location of each gateway 102.

The example recommender system 400 also includes a matrix builder 408 and a plugin recommendation processor 410. The matrix builder 408 generates a plurality of matrices using information from one or more of the databases 402-406. For example, the matrix builder 408 extracts a gateway-plugin matrix using information from the database(s) 402-406 to identify the plugins installed on each gateway 102. The matrix builder 408 can generate a plugin-to-plugin colocation matrix to identify counts of plugins installed together at the same gateway 102. The matrix builder 408 can also create a gateway feature matrix identifying and associating features of each gateway 102.

In certain examples, the plugin recommendation processor 410 applies a smart learning algorithm, such as a k-means clustering algorithm, on the gateway feature matrix and the gateway-plugin matrix to identify group(s) of similar gateways and groups of similar plugins. For example, the k-means clustering algorithm uses Euclidean distance as a similarity measure. After applying k-means, each plugin and gateway 102 is assigned at least one group.

The plugin recommendation processor 410 can generate one or more types of plugin recommendations based on available data, gateway 102 information, group(s), matrices, etc. For example, the plugin recommendation processor 410 can generate collaborative-based recommendations, content-based recommendations, demographic recommendations, knowledge-based recommendations, and/or consolidated recommendations, etc.

For a collaborative-based recommendation, the recommendation processor 410 generates a list of possible plugins based on similar known gateways 102. With a collaborative model, the matrix builder 408 constructs a matrix of gateways 102 and plugins installed on each gateway 102 from the database of plugins 104 and the database of gateways 106. Then, the plugin recommendation processor 410 ranks gateways having installed plugins in common with the current gateway 102. One or more plugin recommendations are generated by the processor 410 from a list of plugins in the similar gateways and that are not in the current gateway 102. That is, if a plugin is already installed in the current gateway 102, then the gateway 102 will recognize and use that plugin to communicate with the device 214-222. Since the plugin has not yet been installed to help the gateway 102 and device 214-222 communicate, the plugin is assumed to be one on a similar gateway that is not yet installed on the gateway 102 being configured, for example.

For a content-based recommendation, the processor 410 generates a list of possible plug-ins based on their similarity with the current installed set of devices 214-222. Thus, given a plurality of devices 214-222 already installed and communicating with the gateway 102, the content-based recommendation assumes that the new plugin will be similar to the plugins already installed.

More specifically, for each plugin currently installed on the gateway 102, the matrix builder 408 computes a similarity matrix to each other plugin in the database 402. The matrix builder 408 applies a distance measure to determine similarity, e.g., Euclidean distance, etc., to form the matrix. The similarity matrix is used by the plugin recommendation processor 410 to compute clusters or groups of plugins using K-means, for example. Each new gateway 102 being evaluated is assigned to a computed cluster to which its distance measure is closest. If there is a tie between clusters, the recommendation processor 410 can use multiple clusters (e.g., the tying clusters, all close clusters, all clusters, etc.) for plugin recommendation. The content-based plugin recommendation processor 410 creates a list of recommendations by selecting the most common plugins in the cluster(s) assigned to the new gateway 102, for example.

For a demographic recommendation, the plugin recommendation processor 410 generates recommendations based on similar systems in the same geolocation and demographic population. For example, when the location of the new gateway 102 is available, the plugin recommendation processor 410 can identify common plugins installed in nearby systems. The recommendation processor 410 can access the location and plugin databases 402, 406 to determine a likelihood of each plugin being applicable to the gateway 102 and recommend the top most likely plugin(s). In certain examples, nearby systems are identified using a radius around the location of the gateway 102.

For a knowledge-based recommendation, the recommendation processor 410 recommends plugins based on known available resources of the gateway 102, current installed IoT devices 214-222, and associated device 214-222 requirements.

In certain examples, a consolidated recommendation can be generated by the plugin recommendation processor 410 by combining recommendation types into a recommendation. For example, the recommendation processor 410 can consolidate recommendations by weight, in which each recommendation is weighted and combined to generate one or more plugin recommendations for retrieval and provisioning to the gateway 102. A weighted approach allows for flexible configuration to prioritize the recommendation according to a particular application and available system information. For example, in cases where demographic information is not available but similar systems are known, demographic recommendation may be lower weighted or even removed.

In another consolidated recommendation, recommendations are cascaded. With cascading, recommendations are applied consecutively by the recommendation processor 410 from high priority to low priority to produce a single recommendation.

In certain examples, a type of consolidation can be selected based on information available for the devices 214-222 and gateways 102 and/or based on a particular application (e.g., a house gateway versus an office gateway, etc.).

A hybrid combination of recommendation types can provide a plurality of alternative outputs. For example, a hybrid can facilitate preemptive installation of most likely future plugin(s) by forwarding translator(s) and/or dependency(-ies). Preemptive detection of most likely plugin(s) can be determined by deploying a specific discovery mechanism to the gateway 102 and/or connected device(s) 214-222, for example. Identification of most likely compatible plugins, future devices, and services can be determined via hybrid recommendation combination, for example.

Figure 5:
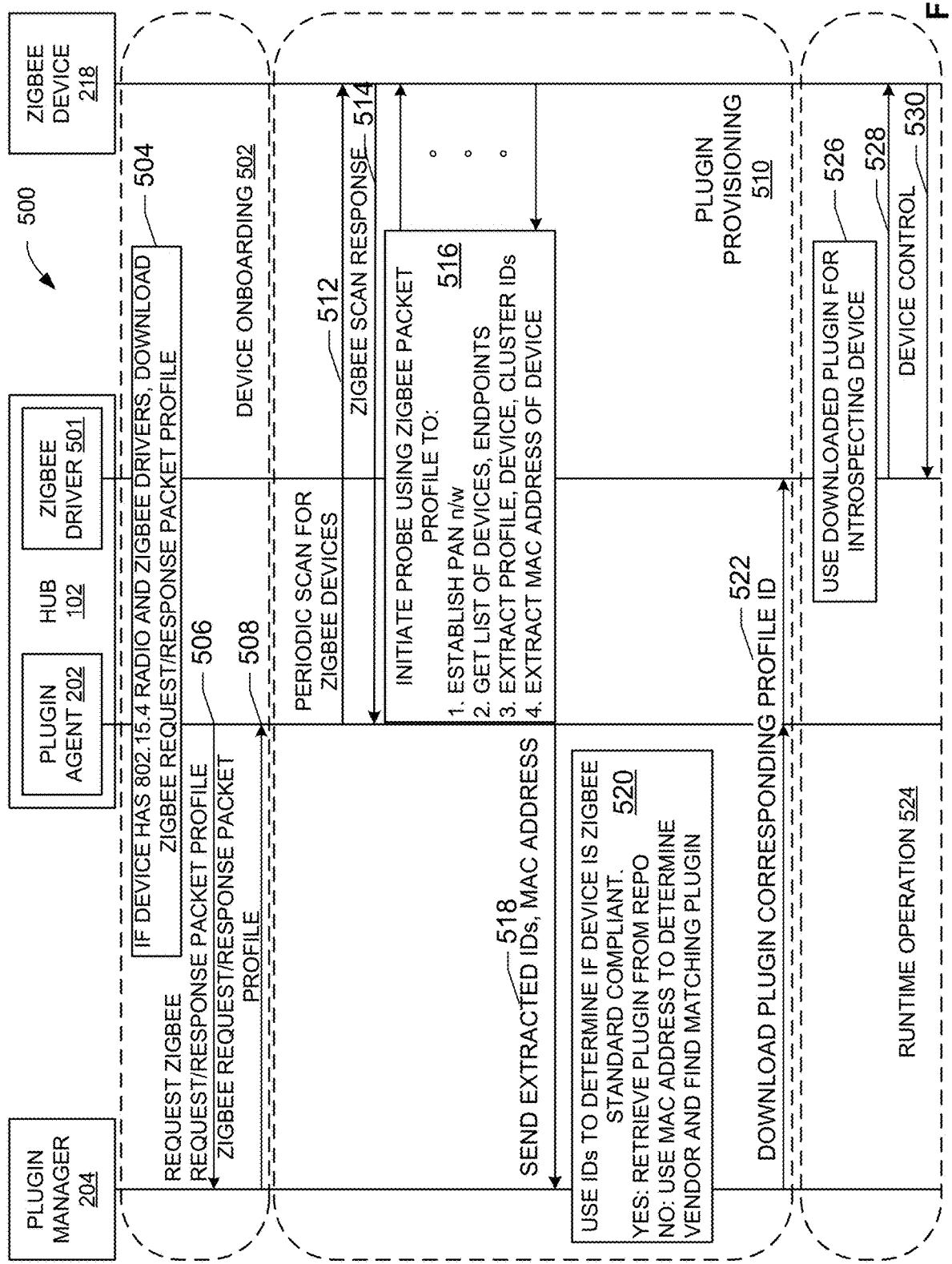
FIGS. 5-6 are data flow diagrams depicting example exchange of messages and data to configure devices with respect to a hub and cloud-based plugin manager.
Figure 6:
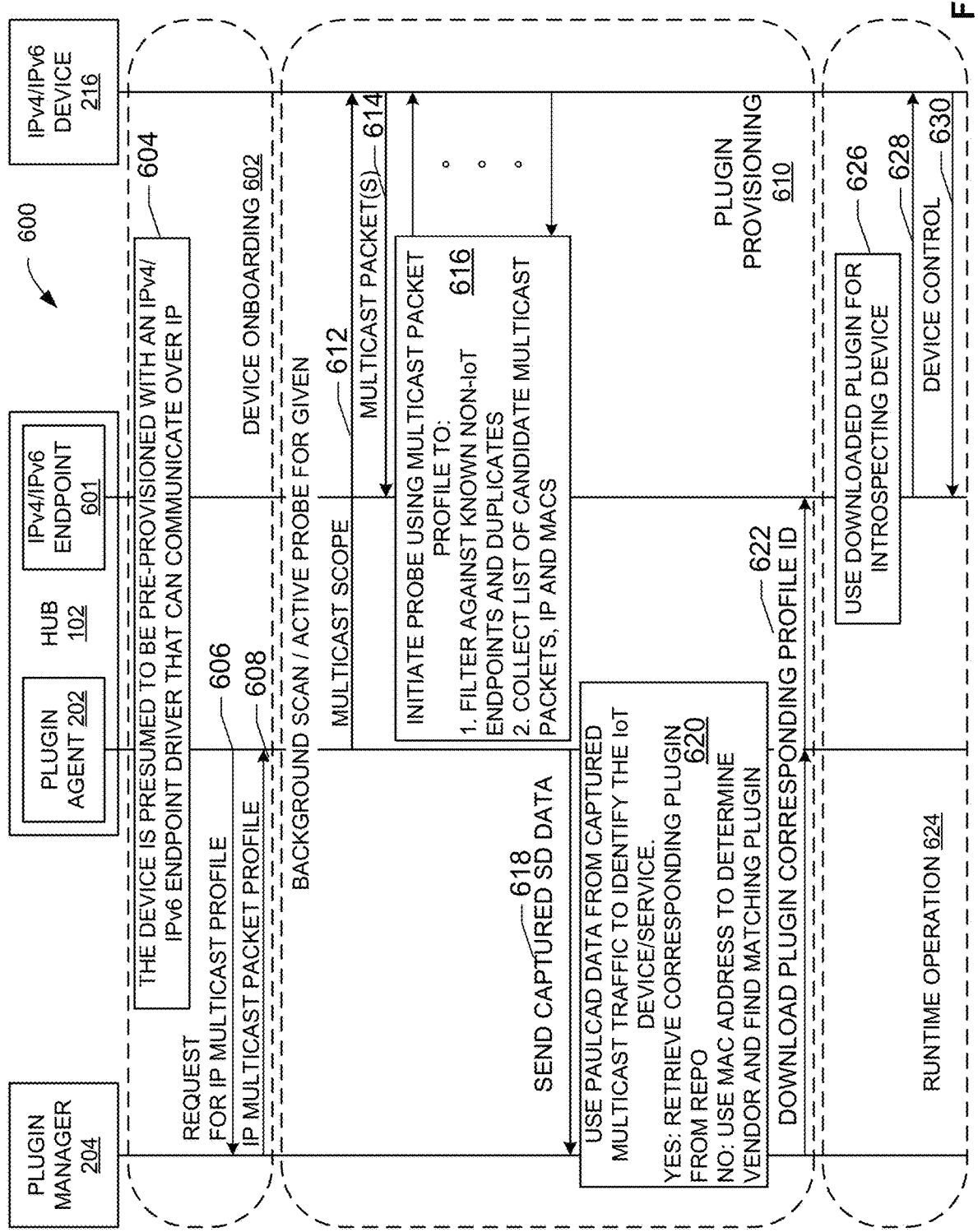

FIGS. 5-6 are data flow diagrams depicting example exchange of messages and data to configure devices 214-222 with respect to the gateway hub 102 and cloud-based plugin manager 204.

FIG. 5 uses ZigBee™ as an example to show message flow 500 between the gateway plugin agent 202 and cloud plugin manager 204 to determine and then download the appropriate ZigBee plugin 501. In the example of FIG. 5, the out-of-box gateway/hub device 102 does not include a ZigBee plugin 501. As a part of the hub 102 on-boarding process 502, a "light" ZigBee packet profile is downloaded 504 to the gateway 102 if the gateway 102 has the proper radio and drivers (e.g., 802.15.4 radio and ZigBee drivers 501 to download packet profile to the gateway 102, etc.). For example, at 506, the plugin agent 202 requests the Zigbee request/response packet profile from the plugin manager 204. At 508, the ZigBee request/response packet profile is provided by the plugin manager 204 to the plugin agent 202.

During plugin provisioning 510, the packet profile is used to scan 512 (e.g., active and/or passive) for ZigBee devices on the home network. When a ZigBee device 218, is discovered by the gateway 102 through a scan response 514, the plugin agent 202 of the gateway hub 102 establishes a connection 516 to the device 218 using a ZigBee packet to probe to gather information (e.g., device type, profile identifier (ID), cluster identifier, device identifier, etc.). For example, a personal area network (PAN) can be established between the agent 202 and the device 218 to gather a list of devices, endpoints, etc., associated with the device 218 to communicate with the gateway 102. Triggered by the probe using the PAN, the agent 202 can extract profile information, device information, cluster ID(s), device MAC address, etc.

The extracted information is sent 518 to the cloud plugin manager 204 by the plugin agent 202. The plugin manager 204 parses 520 the extracted device information using the packet profile and relevant data (e.g., ZigBee profileID, clusterID, deviceID, etc.). The cloud plugin manager 204 uses the ZigBee profileID to determine an appropriate ZigBee category (e.g., home automation, lighting, industrial, commercial, telecommunications, etc.) and device and/or clusterID to determine specifics of the device 218. For example, a ZigBee-compliant occupancy sensing light bulb has a profileID (0x0104) indicating the device is a home automation device, a clusterID (0x0406) indicating the device is capable of occupancy sensing, and a device ID (0x0106) indicating the lighting control functionality includes sensing capability. The plugin manager 204 can then download 522 a ZigBee Home Automation Lighting Control plugin to the gateway 102. The example of FIG. 5 shows that a ZigBee plugin is downloaded on-demand (e.g., when a ZigBee device is discovered in the home), and the downloaded plugin corresponds to the specific functionality associated with the device 218 to control, e.g., occupancy-based lighting control.

In contrast, without such capability, the gateway 102 manufacturer would pre-install a generic ZigBee plugin on the device 218. The generic ZigBee plugin has a large memory footprint since the plugin has to control any ZigBee device.

In a runtime operation phase 524, the downloaded plugin is used to introspect 526 the device 218. For example, device control information is exchanged between the device 218 (528) and the gateway 102 (530).

FIG. 6 illustrates an example data message flow 600 for an IPv4/IPv6 based device 216. In the example of FIG. 6, during device onboarding 602, the device 216 is presumed to be pre-provisioned 604 with an IPv4/IPv6 endpoint driver 601 that can communicate over Internet Protocol (IP). The gateway/hub 102 initially requests 606 and receives 608 an IP multicast packet profile from the cloud plugin manager 204 that would request it to join well-known multicast groups in which supported devices classes are being used (e.g., SSDP, mDNS, proprietary, etc.).

During plugin provisioning 610, the plugin agent 202 begins a background scan and/or active probe 612 for a particular multicast device scope. Multicast packet(s) can be received 614 from the device 216. When a device 216 is identified, a probe is initiated 616. The plugin agent 202 of the gateway device 102 includes a known set of multicast services on the network that have already been flagged as non-IoT. Newly discovered services can be filtered against these known non-IoT endpoints and duplicates can be discarded. A list of candidate multicast packets, IP information, and MAC addresses can be gathered for the plugin agent 202.

For example, when new multicast traffic is received that has not yet been categorized, the gateway 102 gathers a single or a collection of multicast traffic packets (e.g., at its own discretion based on current active policy, etc.). The captured data is associated with the local IP and destination MAC address, and duplicates are continuously filtered out at the gateway 102. The resulting data is sent 618 to the cloud plugin manager service 204, which attempts to match 620 the data based on known traffic patterns for the specific IoT device or service. If a plugin exists for the particular IoT device/service, the cloud service 204 provides 622 the plugin to the gateway 102 (e.g., from the plugin repository 138), and the plugin is then authenticated, loaded and enabled by the plugin agent 202.

During runtime operation 624, the downloaded plugin is used to introspect 626 the device 216. For example, device control information is exchanged between the device 216 (628) and the gateway 102 (630).

Thus, while standardization efforts, such as OCF, are gaining momentum, the majority of devices use proprietary protocols and data models. Certain examples autonomously identify third-party devices and services and expose them in a standardized fashion on the domain to allow for communication, integration, and a next level of innovation in the connected/smarthome domain. Certain examples can enable and integrate a fragmented eco-system without end user/customer involvement such that new/additional devices can be updated/managed centrally using the plugin agent 202 and plugin manager 204.

While example implementations of the systems 100, 200, the plugin recommender system 400, and the system data flows 500, 600 are illustrated in FIGS. 1-6, one or more of the elements, processes and/or devices illustrated in FIGS. 1-6 may be combined, divided, re-arranged, omitted, eliminated and/or implemented in any other way. Further, the example gateway 102, foundation 104, plugin foundation 106, operating system and platform services 108, communication interfaces 110-114, devices 118-124, 214-222, cloud-based plugin infrastructure 134, plugin matching service 136, plugin repository 138, plugin agent 202, plugin manager 204, recommender system 400, databases 402-406, matrix builder 408, plugin recommendation processor 410, and/or, more generally, the example systems 100, 200 of FIGS. 1-4 may be implemented by hardware, software, firmware and/or any combination of hardware, software and/or firmware. Thus, for example, any of the example gateway 102, foundation 104, plugin foundation 106, operating system and platform services 108, communication interfaces 110-114, devices 118-124, 214-222, cloud-based plugin infrastructure 134, plugin matching service 136, plugin repository 138, plugin agent 202, plugin manager 204, recommender system 400, databases 402-406, matrix builder 408, plugin recommendation processor 410, and/or, more generally, the example systems 100, 200 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example gateway 102, foundation 104, plugin foundation 106, operating system and platform services 108, communication interfaces 110-114, devices 118-124, 214-222, cloud-based plugin infrastructure 134, plugin matching service 136, plugin repository 138, plugin agent 202, plugin manager 204, recommender system 400, databases 402-406, matrix builder 408, plugin recommendation processor 410, and/or, more generally, the example systems 100, 200 of FIGS. 1-4 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-4 may include one or more elements, processes and/or devices in addition to, or instead of, those illustrated in FIGS. 1-4, and/or may include more than one of any or all of the illustrated elements, processes and devices.

Figure 7:
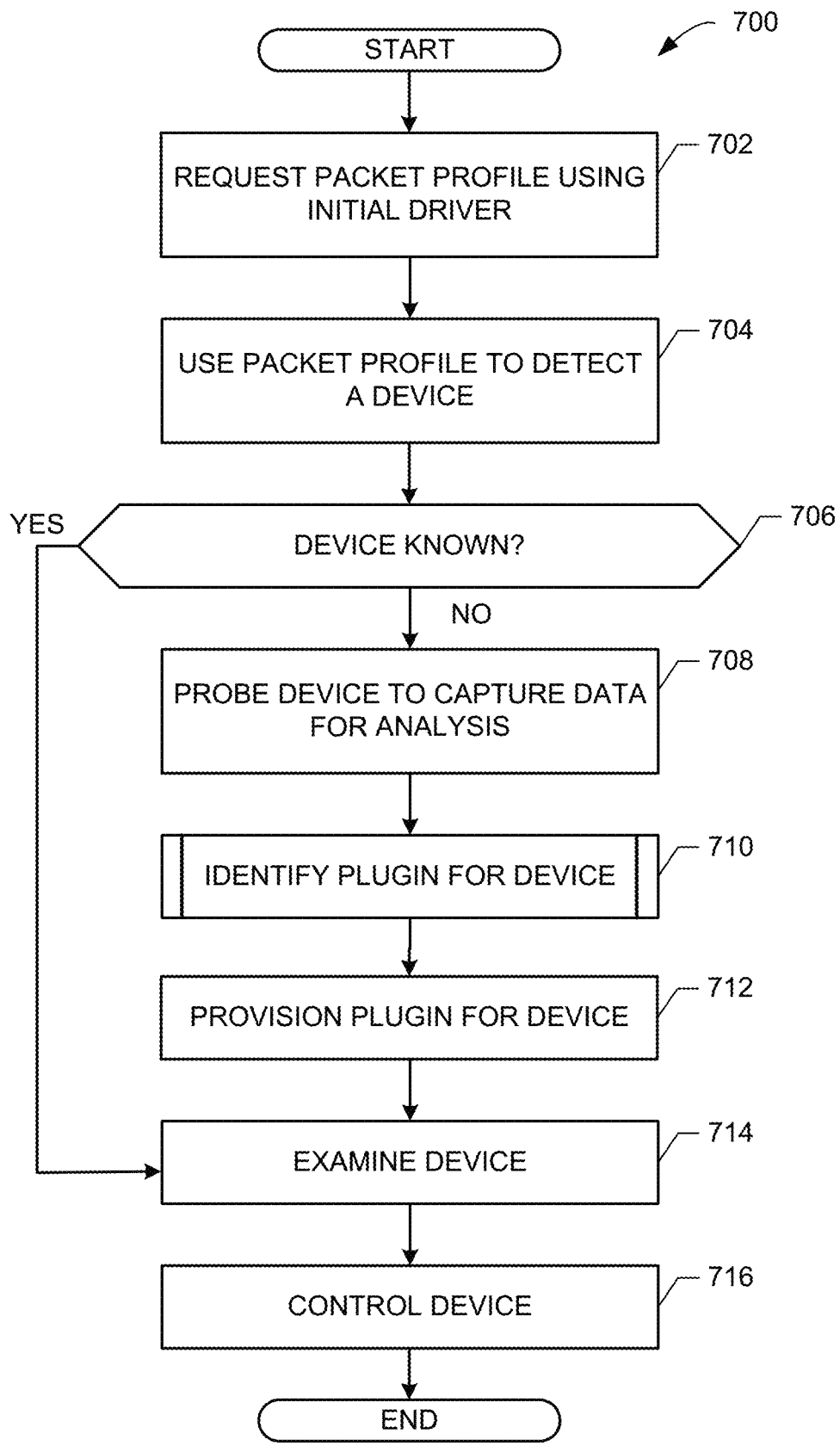
FIGS. 7-8C are flowcharts representative of example machine readable instructions that may be executed to implement the example systems and data flow of FIGS. 1-6.
Figure 8A:
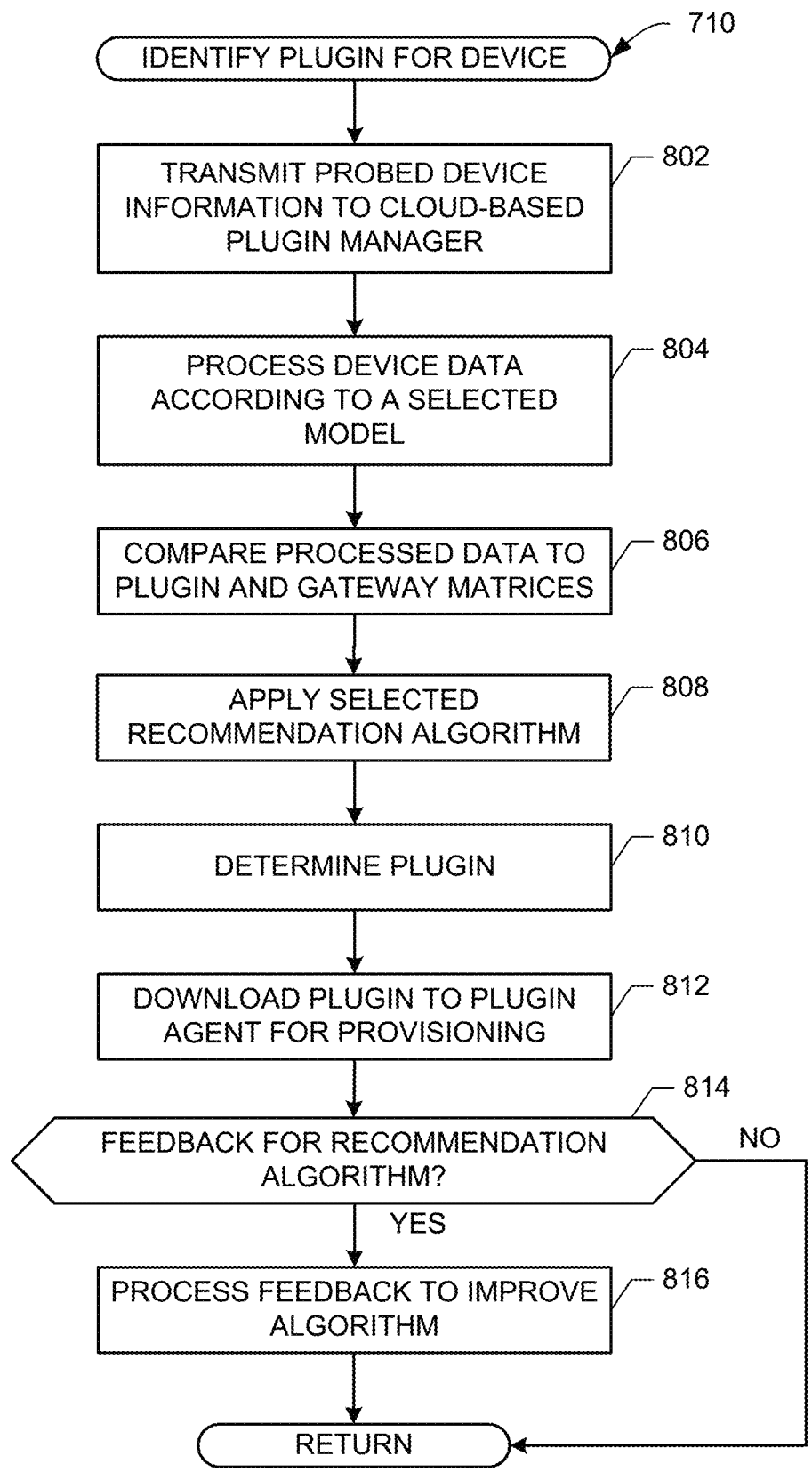
Figure 8B:
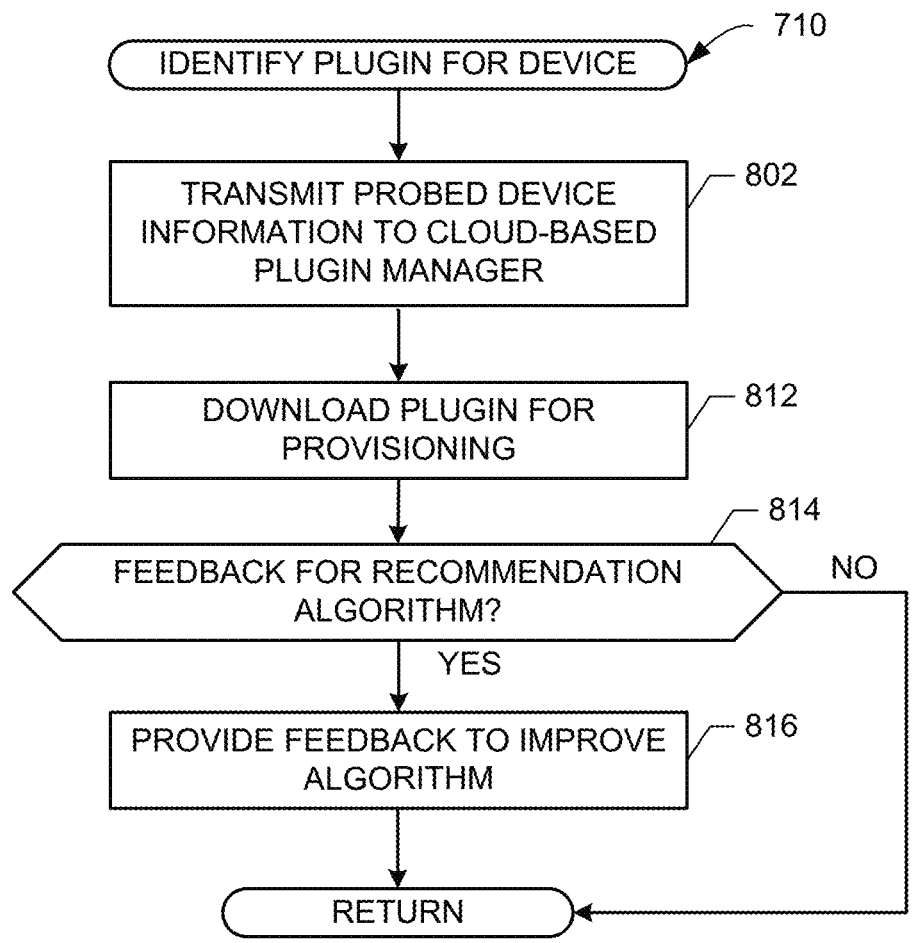
Figure 8C:
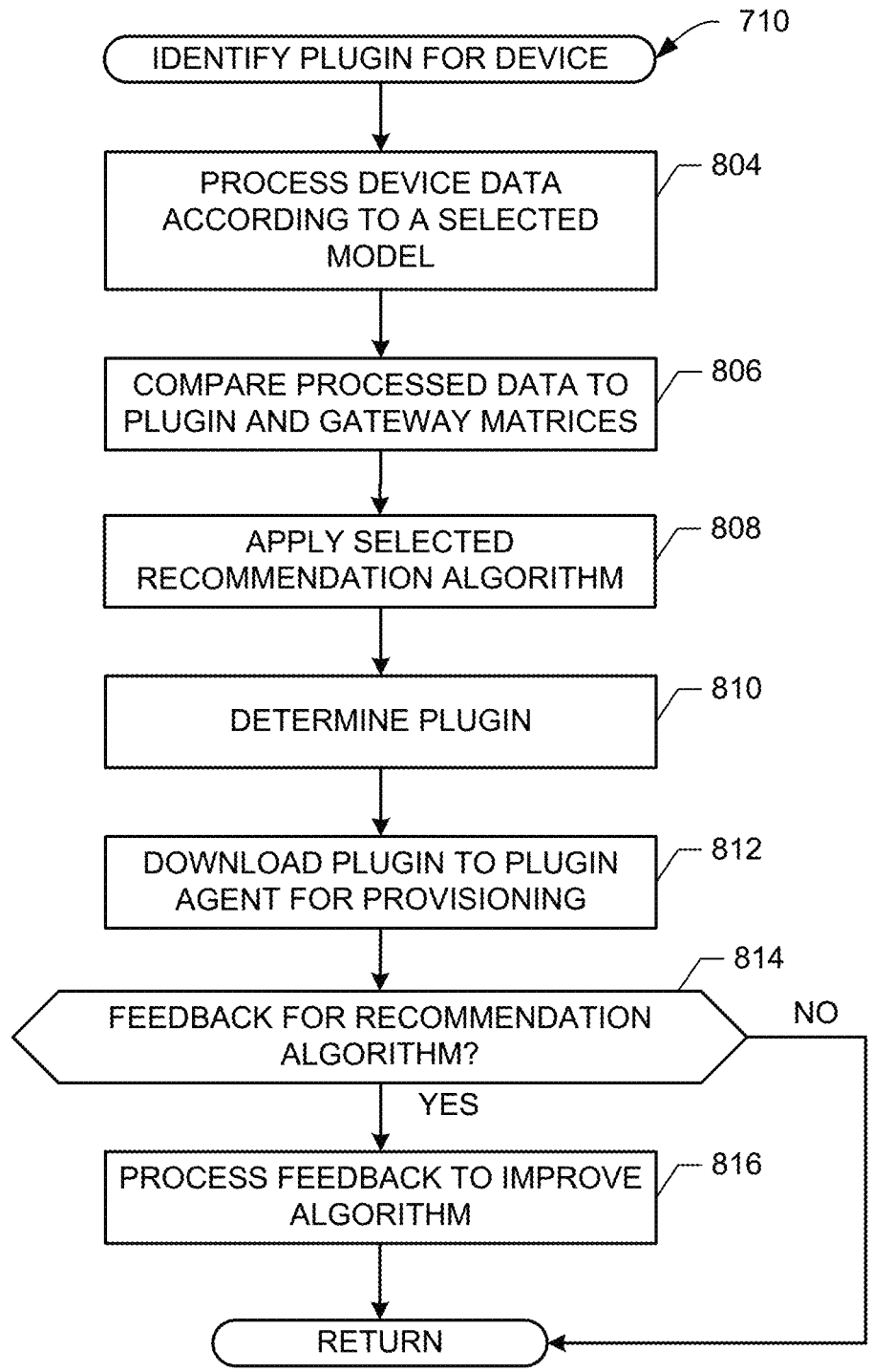

Flowcharts representative of example machine readable instructions for implementing the systems 100, 200, and/or 400 of FIGS. 1-4 are shown in FIGS. 7-8C. In these examples, the machine readable instructions comprise a program for execution by a processor such as the processor 912, 1012 shown in the example processor platform 900, 1000 discussed below in connection with FIGS. 9-10. The program may be embodied in software stored on a tangible computer readable storage medium such as a CD-ROM, a floppy disk, a hard drive, a DVD, a Blu-ray disk, or a memory associated with the processor 912, 1012, but the entire program and/or parts thereof could alternatively be executed by a device other than the processor 912, 1012 and/or embodied in firmware or dedicated hardware. Further, although the example programs are described with reference to the flowcharts illustrated in FIGS. 7-8C, many other methods of implementing the example systems 100, 200, and/or 400 may alternatively be used. For example, the order of execution of the blocks may be changed, and/or some of the blocks described may be changed, eliminated, or combined.

As mentioned above, the example processes of FIGS. 7-8C may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-8C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 700 of FIG. 7 begins with onboarding a device 118-124, 214-222 with respect to the gateway/hub 102. For example, at block 702, an initial driver is used by the plugin agent 202 of the gateway device 102 to request a packet profile for device detection. For example, a ZigBee device request/response packet profile, IP multicast packet profile, etc., can be requested from the cloud-based plugin manager 204 and provided to the plugin agent 202 of the gateway device 102. At block 704, the gateway 102 uses the packet profile (e.g., multicasts the IP packet(s)) to detect the device 118-124, 214-222. For example, the gateway 102 sends messages (e.g., packets) using the packet profile to detect the presence of the device 118-124, 214-222 with respect to the gateway 102.

At block 706, device 118-124, 214-222 is reviewed to determine whether the device 118-124, 214-222 is of a known type. For example, the device 118-124, 214-222 is queried to determine whether the plugin associated with the device 118-124, 214-222 is already known and/or otherwise installed by the plugin agent 202 at the gateway 102. For example, the device may be an OCF device and/or of a previously analyzed device type, etc., such that no plugin is necessary or the plugin is already installed at the gateway 102. If the device is not known, then, at block 708, a probe is initiated with the detected device 118-124, 214-222 to gather data from the device. For example, device data packets, MAC address, IP address, protocol information, etc., can be captured by the probe from the plugin agent 202.

At block 710, the captured data is used to identify a plugin for the device 118-124, 214-222. For example, the data is sent to the plugin manager 204 to identify and download a plugin for the device 118-124, 214-222. One or more matrices, clusters, models, and/or recommendation algorithms can be used to identify a recommendation of one or more plugins to be downloaded by the plugin agent 202 to facilitate interaction between the device 118-124, 214-222 and the hub 102.

At block 712, the plugin is provisioned for the device 118-124, 214-222. For example, the recommended plugin is downloaded and installed by the plugin agent 202 so the gateway 102 can communicate with the device 118-124, 214-222. At block 714, once communication has been established, the gateway 102 can introspect or examine the device 118-124, 214-222 to learn from the plugin provisioning, identify further information about the device 118-124, 214-222 and its operation, etc. At block 716, the gateway 102 can control the device 118-124, 214-222 via the plugin. For example, the plugin allows the gateway 102 to communicate with and send commands/instructions to the device 118-124, 214-222 on behalf of the gateway 102, another device 118-124, 214-222, an external system, a user, etc.

Additional detail associated with identifying a plugin for the device (block 710) is shown in the example of FIG. 8A. At block 802 in the illustrated example of FIG. 8A, the example plugin agent 202 transmits the probed device data to the cloud-based plugin manager 204. For example, device data packets, MAC address, IP address, protocol information, etc., captured by the probe from the plugin agent 202 are provided to the plugin manager 204. At block 804, the device data is processed by the plugin manager 204 according to a selected model. For example, as described above, the plugin manager 204 and its recommender system 400 can apply a collaborative model, a content-based model, a demographic model, a knowledge-based model, etc., to analyze the captured device data.

At block 806, the processed/modeled data is compared to plugin and gateway matrices. For example, the matrix builder 408 generates one or more plugin and/or gateway matrices from databases 402-406, and the plugin recommendation processor 410 compares the processed device data to the matrices.

At block 808, the plugin recommendation processor 410 applies a selected recommendation algorithm to the data. For example, a collaborative recommendation algorithm, content-based recommendation algorithm, demographic recommendation algorithm, knowledge-based recommendation algorithm, and/or other clustering algorithm can be applied to the processed, modeled, compared data to recommend one or more plugins for the gateway 102 to interact with the device 118-124, 214-222.

At block 810, a plugin is determined for the device 118-124, 214-222 based on the output of the recommendation algorithm. For example, if a plurality of plugin recommendations are provided, guidance from the selected algorithm influences the plugin recommendation processor 410 to select a plugin for the device 118-124, 214-222 to allow the gateway 102 (and other IoT devices, services, applications, etc., connected to the gateway 102) to communicate with the device 118-124, 214-222. At block 812, the selected plugin is downloaded from the cloud service 134 to the plugin agent 202 at the gateway device 102.

At block 814, the plugin manager 204 and/or plugin agent 202 review to determine whether feedback exists to update the recommendation algorithm. For example, operational feedback can be gathered based on success and/or failure of communication between the gateway 102 and device 118-124, 214-222 using the selected plugin, extend of communication and/or control of the device 118-124, 214-222 achieved using the plugin, user and/or other application override/reconfiguration with respect to communication between the gateway 102 and the device 118-124, 214-222, etc., to assist the recommendation algorithm in learning to improve its matching of device(s) to plugins. At block 816, if feedback exists, then feedback is used by the plugin recommendation processor 410 to improve performance of one or more plugin recommendation algorithms, for example.

FIG. 8B provides additional detail associated with identifying a plugin for the device (block 710) from the perspective of the plugin agent 202 at the gateway 102. At block 802, the example plugin agent 202 transmits the probed device data to the cloud-based plugin manager 204. For example, device data packets, MAC address, IP address, protocol information, etc., captured by the probe from the plugin agent 202 are provided to the plugin manager 204. At block 812, the selected plugin is downloaded from the cloud service 134 to the plugin agent 202 at the gateway device 102.

At block 814, the plugin agent 202 reviews to determine whether feedback exists to update the recommendation algorithm. For example, operational feedback can be gathered based on success and/or failure of communication between the gateway 102 and device 118-124, 214-222 using the selected plugin, extend of communication and/or control of the device 118-124, 214-222 achieved using the plugin, user and/or other application override/reconfiguration with respect to communication between the gateway 102 and the device 118-124, 214-222, etc., to assist the recommendation algorithm in learning to improve its matching of device(s) to plugins. At block 816, if feedback exists, then feedback is provided by the plugin agent 202 to the plugin manager 204 to improve performance of one or more plugin recommendation algorithms, for example.

FIG. 8C provides additional detail associated with identifying a plugin for the device (block 710) from the perspective of the cloud-based plugin manager 204. At block 804, device data received from the plugin agent 202 is processed by the plugin manager 204 according to a selected model. For example, as described above, the plugin manager 204 and its recommender system 400 can apply a collaborative model, a content-based model, a demographic model, a knowledge-based model, etc., to analyze the captured device data.

At block 806, the processed/modeled data is compared to plugin and gateway matrices. For example, the matrix builder 408 generates one or more plugin and/or gateway matrices from databases 402-406, and the plugin recommendation processor 410 compares the processed device data to the matrices.

At block 808, the plugin recommendation processor 410 applies a selected recommendation algorithm to the data. For example, a collaborative recommendation algorithm, content-based recommendation algorithm, demographic recommendation algorithm, knowledge-based recommendation algorithm, and/or other clustering algorithm can be applied to the processed, modeled, compared data to recommend one or more plugins for the gateway 102 to interact with the device 118-124, 214-222.

At block 810, a plugin is determined for the device 118-124, 214-222 based on the output of the recommendation algorithm. For example, if a plurality of plugin recommendations are provided, guidance from the selected algorithm influences the plugin recommendation processor 410 to select a plugin for the device 118-124, 214-222 to allow the gateway 102 (and other IoT devices, services, applications, etc., connected to the gateway 102) to communicate with the device 118-124, 214-222. At block 812, the selected plugin is downloaded from the cloud service 134 to the plugin agent 202 at the gateway device 102.

At block 814, the plugin manager 204 reviews to determine whether feedback exists to update the recommendation algorithm. For example, operational feedback can be gathered based on success and/or failure of communication between the gateway 102 and device 118-124, 214-222 using the selected plugin, extend of communication and/or control of the device 118-124, 214-222 achieved using the plugin, user and/or other application override/reconfiguration with respect to communication between the gateway 102 and the device 118-124, 214-222, etc., to assist the recommendation algorithm in learning to improve its matching of device(s) to plugins. At block 816, if feedback exists, then feedback is used by the plugin recommendation processor 410 to improve performance of one or more plugin recommendation algorithms, for example.

Thus, certain examples provide a plugin foundation as a framework that allows a gateway/hub device to load plugin (e.g., translation library) information to allow the gateway to communicate and/or otherwise interact with devices that do not comply with its default format or standard (e.g., non-OCF devices, etc.). The gateway can talk over multiple media (e.g., WiFi, BLE, etc.), capture device information, and provide the information to a cloud-based plugin service for look-up. For example, the gateway pings the device for information and provides the device's response to the cloud service, which provides an appropriate plugin/translation library based on the gathered device information, known device information, and one or more models/recommendation algorithms.

Certain examples provide smart learning capability to improve recommendation by learning existing devices, identifying patterns of new devices, learn user preferences, etc., and predicting what type/brand/format of device is likely to be next seen by the hub.

Certain examples provide a gateway plugin agent in communication with a cloud-based plugin manager to facilitate exchange of information, analysis, and plugin provisioning while decoupling the cloud and the gateway/hub to dynamically accommodate a plurality of gateways, new devices, etc. In certain examples, the plugin agent provides functionality to issue requests/probe packages and preparing a received device response for analysis, but parsing of the device response and matching device to plug is done by the plugin manager in the cloud. In certain examples, the plugin agent includes more or less sophisticated processing power to divide some or all work with the cloud plugin manager.

In certain examples, the cloud-based plugin manager is communicating with multiple agents in multiple environments (e.g., homes, offices, stores, etc.). The cloud-based plugin manager can learn patterns by individual home, geographic region, etc. (e.g., in the United States, in China, in Illinois, etc.).

In certain examples, the manager works with one or more agents to monitor, maintain, and/or quarantine plugin(s) based on runtime operational feedback. In certain examples, the plugin agent can include information regarding "normal" communication patterns between third party devices that are being enabled by the gateway so the agent, alone or in conjunction with the cloud-based manager, can compare and detect security related issues with malware, etc.

Figure 9:
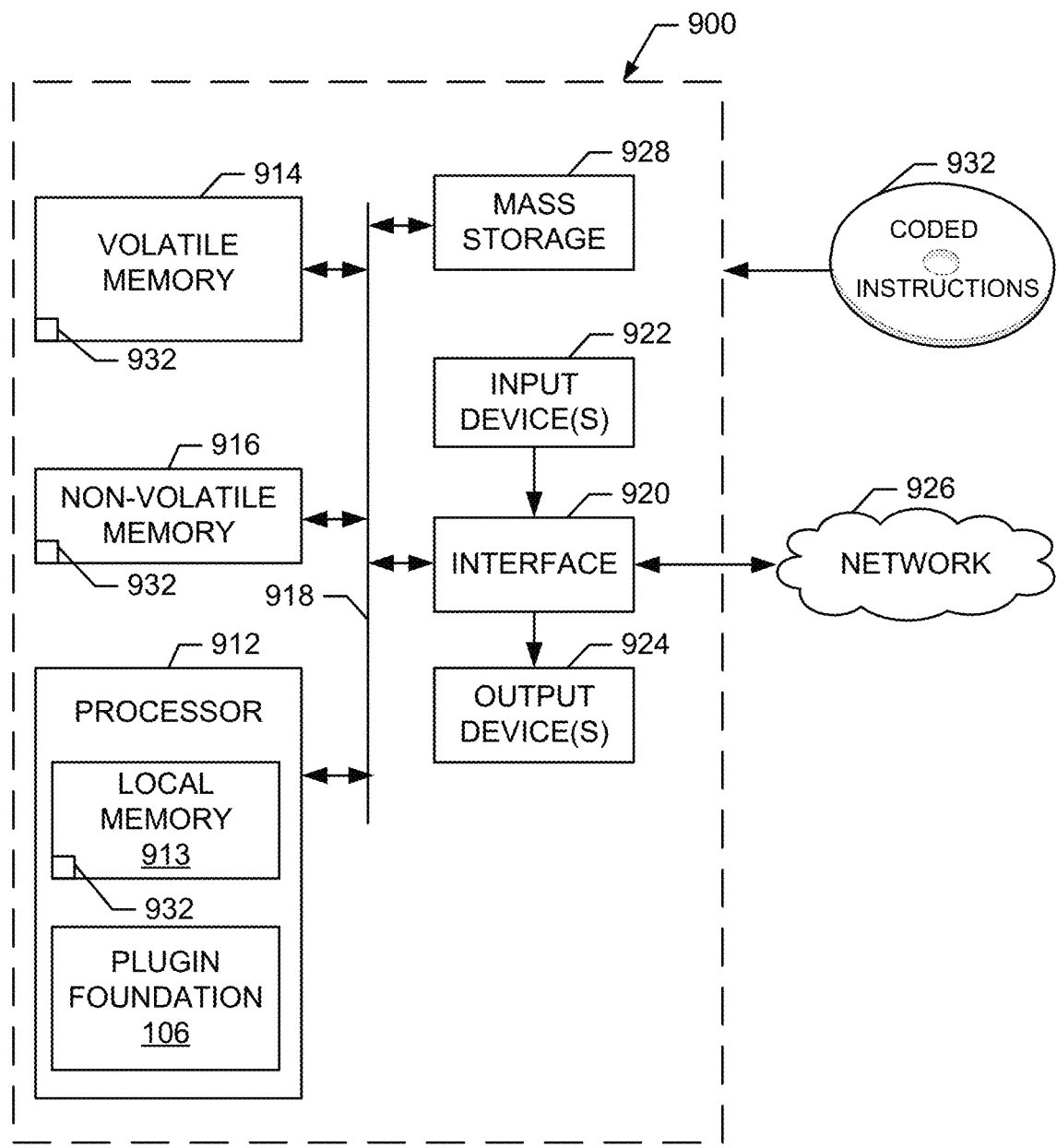
FIGS. 9-10 are schematic illustrations of an example processor platform that may execute the instructions of FIGS. 7-8C to implement the example systems of FIGS. 1-4 and data flow of FIGS. 5-6.

FIG. 9 is a block diagram of an example processor platform 900 capable of executing the instructions of FIGS. 7-8C to implement the systems of FIGS. 1-4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example, the processor 912 is structured to include the example plugin foundation 106, etc. In certain examples, the processor platform 900 can be replicated to implement both the plugin foundation 106 of the gateway 102 and the plugin matching service 136 of the cloud 134. The plugin foundation 106 is shown in the example of FIG. 9 for purposes of illustration only.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, one or more input devices 922 are connected to the interface circuit 920. The input device(s) 922 permit(s) a user to enter data and commands into the processor 912. The input device(s) 922 can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7-8 may be stored in the mass storage device 928, in the volatile memory 914, in the non-volatile memory 916, and/or on a removable tangible computer readable storage medium such as a CD or DVD.

Figure 10:
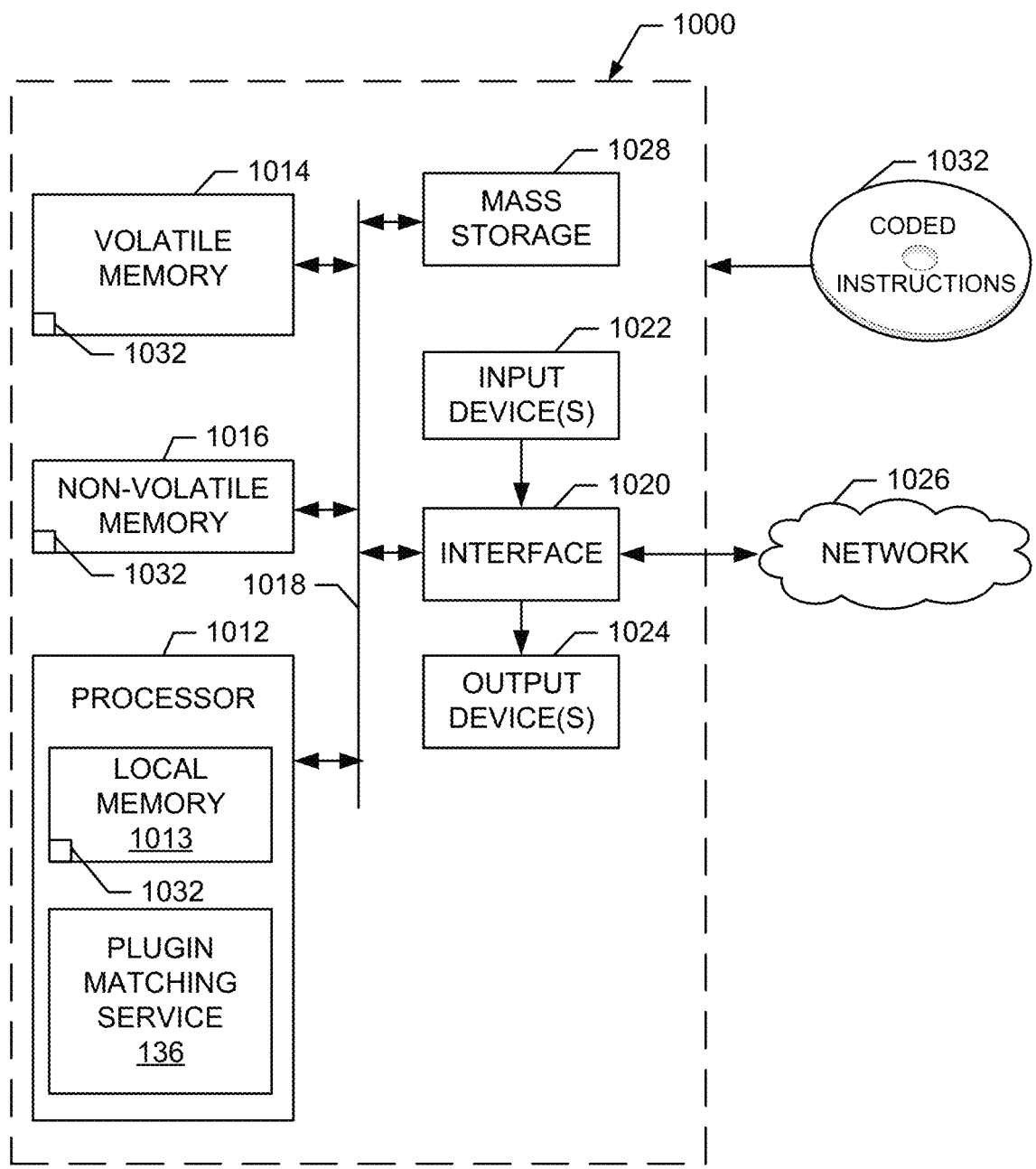

FIG. 10 is a block diagram of an example processor platform 1000 capable of executing the instructions of FIGS. 7-8C to implement the systems of FIGS. 1-4. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example, the processor 1012 is structured to include the example plugin matching service 136, etc. In certain examples, the processor platform 1000 can be replicated to implement both the plugin foundation 106 of the gateway 102 and the plugin matching service 136 of the cloud 134. The plugin matching service 136 is shown in the example of FIG. 10 for purposes of illustration only.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a peripheral component interconnect (PCI) express interface.

In the illustrated example, one or more input devices 1022 are connected to the interface circuit 1020. The input device(s) 1022 permit(s) a user to enter data and commands into the processor 1012. The input device(s) 1022 can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 7-8C may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture facilitate identification, analysis, provisioning, and communication with IoT devices at a gateway/hub device. Certain examples dynamically support devices regardless of platform/format and dynamically identify a plugin to support communication with and/or control of devices that do not comply with the protocol/format of the gateway/hub device. Certain examples provide learning recommendation algorithms which improve over time/experience to better match plugin translation libraries with connecting devices.

Example 1 is an apparatus including a gateway device to communicate according to a first protocol. The gateway device includes a plugin agent to discover a first device and probe the first device to gather data regarding the first device. The plugin agent is to transmit the gathered data to a plugin manager to determine whether the first device is to communicate via the first protocol, and, when the first device is unable to communicate via the first protocol, determine a plugin for the gateway device to enable the gateway device to communicate with the first device. The plugin agent is to provision the plugin for the gateway device with respect to the first device.

Example 2 includes the subject matter of Example 1, wherein the plugin agent is deployed in a plugin foundation of the gateway device.

Example 3 includes the subject matter of Example 1, wherein the gateway device includes a plurality of communication interfaces.

Example 4 includes the subject matter of Example 1, wherein the plugin is to translate between the first protocol and a second protocol.

Example 5 includes the subject matter of Example 1, wherein the plugin agent is to query the plugin manager via a cloud-based plugin matching service.

Example 6 is tangible computer readable storage medium including computer readable instructions. When executed, instructions cause a processor to implement at least a gateway device to communicate according to a first protocol. The gateway device includes a plugin agent to discover a first device and probe the first device to gather data regarding the first device. The plugin agent is to transmit the gathered data to a plugin manager to determine whether the first device is to communicate via the first protocol, and, when the first device is unable to communicate via the first protocol, determine a plugin for the gateway device to enable the gateway device to communicate with the first device. The plugin agent is to provision the plugin for the gateway device with respect to the first device.

Example 7 includes the subject matter of Example 6, wherein the plugin agent is deployed in a plugin foundation of the gateway device.

Example 8 includes the subject matter of Example 6, wherein the gateway device includes a plurality of communication interfaces.

Example 9 includes the subject matter of Example 6, wherein the plugin is to translate between the first protocol and a second protocol.

Example 10 includes the subject matter of Example 6, wherein the plugin agent is to query the plugin manager via a cloud-based plugin matching service.

Example 11 is a method including discovering, via a plugin agent of a gateway device including a processor, a first device; probing, via the plugin agent, the first device to gather data regarding the first device; transmitting, via the plugin agent, the gathered data to a plugin manager, the plugin manager to determine whether the first device is to communicate via a first protocol, and, when the first device is unable to communicate via the first protocol, the plugin manager to determine a plugin for the gateway device to enable the gateway device to communicate with the first device; and provisioning, via the plugin agent, the plugin for the gateway device with respect to the first device.

Example 12 includes the subject matter of Example 11, wherein the method includes: determining whether the first device is to communicate via the first protocol; and when the first device is unable to communicate via the first protocol, determining a plugin for the gateway device to enable the gateway device to communicate with the first device.

Example 13 includes the subject matter of Example 11, wherein the plugin agent is deployed in a plugin foundation of the gateway device.

Example 14 includes the subject matter of Example 11, wherein the gateway device includes a plurality of communication interfaces.

Example 15 is an apparatus including a cloud-based plugin matching service to identify a plugin for communication between a gateway device and a first device according to a first protocol. The cloud-based plugin matching service includes a plugin manager to determine whether the first device is to communicate via the first protocol, and, when the first device is unable to communicate via the first protocol, determine a plugin for the gateway device to enable the gateway device to communicate with the first device. The plugin manager is to transmit the plugin to a plugin agent to provision the plugin for the gateway device with respect to the first device.

Example 16 includes the subject matter of Example 15, wherein the plugin manager retrieves plugins from a cloud-based plugin repository.

Example 17 includes the subject matter of Example 15, wherein the plugin is determined using a recommendation algorithm and a manifest of data regarding the first device.

Example 18 includes the subject matter of Example 17, wherein the data is modeled and compared to one or more matrices using the recommendation algorithm.

Example 19 includes the subject matter of Example 18, wherein the recommendation algorithm includes at least one of a collaborative recommendation algorithm, a content-based recommendation algorithm, a demographic recommendation algorithm, a knowledge-based recommendation algorithm, or a consolidated recommendation algorithm.

Example 20 includes the subject matter of Example 15, wherein the plugin manager includes a plugin recommendation processor, a matrix builder, and a plurality of databases.

Example 21 is a tangible computer readable storage medium including computer readable instructions. When executed, the instructions cause a processor to implement at least a cloud-based plugin matching service to identify a plugin for communication between a gateway device and a first device according to a first protocol. The cloud-based plugin matching service includes a plugin manager to determine whether the first device is to communicate via the first protocol, and, when the first device is unable to communicate via the first protocol, determine a plugin for the gateway device to enable the gateway device to communicate with the first device. The plugin manager is to transmit the plugin to a plugin agent to provision the plugin for the gateway device with respect to the first device.

Example 22 includes the subject matter of Example 21, wherein the plugin manager retrieves plugins from a cloud-based plugin repository.

Example 23 includes the subject matter of Example 21, wherein the plugin is determined using a recommendation algorithm and a manifest of data regarding the first device.

Example 24 includes the subject matter of Example 23, wherein the data is modeled and compared to one or more matrices using the recommendation algorithm.

Example 25 includes the subject matter of Example 24, wherein the recommendation algorithm includes at least one of a collaborative recommendation algorithm, a content-based recommendation algorithm, a demographic recommendation algorithm, a knowledge-based recommendation algorithm, or a consolidated recommendation algorithm.

Example 26 includes the subject matter of Example 21, wherein the plugin manager includes a plugin recommendation processor, a matrix builder, and a plurality of databases.

Example 27 is a method including receiving, at a plugin manager, data gathered from a first device, the plugin manager including a processor; determining, using the plugin manager, whether the first device is to communicate via the first protocol; when the first device is unable to communicate via the first protocol, determining, using the plugin manager, a plugin for the gateway device to enable the gateway device to communicate with the first device; and transmitting, using the plugin manager, the plugin to a plugin agent for provisioning to a gateway device.

Example 28 includes the subject matter of Example 27, wherein the plugin manager is deployed in a cloud-based plugin matching service.

Example 29 includes the subject matter of Example 27, wherein the plugin manager retrieves plugins from a cloud-based plugin repository.

Example 30 includes the subject matter of Example 27, wherein the plugin is determined using a recommendation algorithm and a manifest of data regarding the first device.

Example 31 includes the subject matter of Example 30, wherein the data is modeled and compared to one or more matrices using the recommendation algorithm.

Example 32 includes the subject matter of Example 31, wherein the recommendation algorithm includes at least one of a collaborative recommendation algorithm, a content-based recommendation algorithm, a demographic recommendation algorithm, a knowledge-based recommendation algorithm, or a consolidated recommendation algorithm.

Example 33 includes the subject matter of Example 27, wherein the plugin manager includes a plugin recommendation processor, a matrix builder, and a plurality of databases.

Example 34 includes the subject matter of any of Examples 27-33, further including a manifest to describe how the first device is discoverable.

Example 35 includes the subject matter of any of Examples 27-33, wherein the first device is associated with a first service.

Example 36 includes the subject matter of any of Examples 6-10, wherein the instructions, when executed, further cause the processor to implement a manifest to describe how the first device is discoverable.

Example 37 includes the subject matter of any of Examples 6-10, wherein the first device is associated with a first service.

Example 38 includes the subject matter of any of Examples 11-14, further including processing a manifest to discover the first device.

Example 39 includes the subject matter of any of Examples 1-14, wherein the first device is associated with a first service.

Example 40 includes the subject matter of any of Examples 21-26, wherein the instructions, when executed, further cause the processor to implement a manifest to describe how the first device is discoverable.

Example 41 includes the subject matter of any of Examples 21-26, wherein the first device is associated with a first service.

Example 42 is an apparatus including a means for identifying a plugin for communication between a gateway device and a first device according to a first protocol; and a means for determining whether the first device is to communicate via the first protocol, and, when the first device is unable to communicate via the first protocol, determine a plugin for the gateway device to enable the gateway device to communicate with the first device, the means for determining to transmit the plugin to a means for transmitting to provision the plugin for the gateway device with respect to the first device.

Example 43 includes the subject matter of Example 42, wherein the plugin is determined using a recommendation algorithm and a manifest of data regarding the first device.

Example 44 includes the subject matter of any of Examples 42-43, wherein the data is modeled and compared to one or more matrices using the recommendation algorithm.

Example 45 includes the subject matter of any of Examples 44, wherein the recommendation algorithm includes at least one of a collaborative recommendation algorithm, a content-based recommendation algorithm, a demographic recommendation algorithm, a knowledge-based recommendation algorithm, or a consolidated recommendation algorithm.

Example 46 includes the subject matter of any of Examples 42-45, wherein the means for determining includes a plugin recommendation processor, a matrix builder, and a plurality of databases.

Example 47 is an apparatus including a means for discovering a first device and probe the first device to gather data regarding the first device; and a means for transmitting the gathered data to a means for managing plugins to determine whether the first device is to communicate via the first protocol, and, when the first device is unable to communicate via the first protocol, determine a plugin for the means for discovering to enable the means for discovering to communicate with the first device, the means for transmitting to provision the plugin for the means for discovering with respect to the first device.

Example 48 includes the subject matter of Example 47, wherein the means for transmitting is deployed in a plugin foundation of the gateway device.

Example 49 includes the subject matter of any of Examples 47-48, wherein the means for discovering includes a plurality of communication interfaces.

Example 50 includes the subject matter of any of Examples 47-49, wherein the plugin is to translate between the first protocol and a second protocol.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   processor circuitry to execute the instructions to:
   initiate a probe of a first device, the first device to connect to a hub device, the probe to extract information from the first device including at least one of a communication configuration or connections associated with the first device;
   generate a profile of the first device using the information extracted in response to the probe;
   identify the first device based on the profile;
   determine a plugin for communication between the first device and the hub device based on the identification of the first device; and
   trigger provisioning of the plugin to the first device.

2. The apparatus of claim 1, wherein the first device includes an Internet of Things device.

3. The apparatus of claim 1, wherein the first device includes at least one of an Internet Protocol communication device or a wireless mesh communication protocol device.

4. The apparatus of claim 1, wherein the hub device includes a gateway device for a network.

5. The apparatus of claim 1, wherein the probe includes a query of one or more messages based on at least one of a hardware identifier, a network message, or a protocol exchange.

6. The apparatus of claim 1, wherein the plugin is software that adds a feature to the first device.

7. The apparatus of claim 6, wherein the feature includes a mapping from a first domain to a second domain and an associated a data model representation.

8. The apparatus of claim 1, wherein the information extracted in response to the probe comes from a plurality of network layers for the first device.

9. The apparatus of claim 1, wherein the processor circuitry is to select the plugin of a plurality of plugins from a cloud-based plugin infrastructure.

10. The apparatus of claim 1, further including a communication interface to detect the first device using at least one of a multicast or a periodic scan.

11. A tangible computer readable storage medium comprising computer readable instructions which, when executed, cause a processor circuit to at least:
    generate a profile of a first device using information extracted in response to a probe, the probe to extract information from the first device including at least one of a communication configuration or connections associated with the first device;
    determine a plugin for communication between the first device and a gateway based on an identification of the first device, the identification determined from the profile; and
    trigger provisioning of the plugin to the first device.

12. The tangible computer readable storage medium of claim 11, wherein the instructions, when executed, cause the processor circuit to initiate the probe including a query of one or more messages based on at least one of a hardware identifier, a network message, or a protocol exchange.

13. The tangible computer readable storage medium of claim 12, wherein the probe is to query a plurality of network layers for the first device to extract the information.

14. The tangible computer readable storage medium of claim 11, wherein the instructions, when executed, cause the processor circuitry to provision the plugin to map from a first domain to a second domain and associated a data model representation with the first device.

15. The tangible computer readable storage medium of claim 11, wherein the instructions, when executed, cause the processor circuit to select the plugin from a plurality of plugins of a cloud-based plugin infrastructure.

16. The tangible computer readable storage medium of claim 11, wherein the instructions, when executed, cause the processor circuit to detect the first device using at least one of a multicast or a periodic scan.

17. A method comprising:
   initiating, by executing an instruction using a processor, a probe of a first device, the first device to connect to a hub device, the probe to extract information from the first device including at least one of a communication configuration or connections associated with the first device;
   generating, by executing an instruction using the processor, a profile of the first device using the information extracted in response to the probe;
   identifying, by executing an instruction using the processor, the first device based on the profile;
   determining, by executing an instruction using the processor, a plugin for communication between the first device and the hub device based on the identification of the first device; and
   triggering, by executing an instruction using the processor, provisioning of the plugin to the first device.

18. The method of claim 17, wherein initiating includes initiating the probe including a query of one or more messages based on at least one of a hardware identifier, a network message, or a protocol exchange.

19. The method of claim 17, further including dynamically selecting the plugin from a plurality of plugins of a cloud-based plugin infrastructure.

20. An apparatus comprising:
   means for generating a profile of a first device using information extracted in response to a probe, the probe to extract information from the first device including at least one of a communication configuration or connections associated with the first device;
   means for determining a plugin for communication between the first device and a gateway based on an identification of the first device, the identification determined from the profile; and
   means for triggering a provisioning of the plugin to the first device.

\* \* \* \* \*